US012718241B2

(12) United States Patent
Kettler et al.

(10) Patent No.: US 12,718,241 B2
(45) Date of Patent: Aug. 25, 2026

(54) SYSTEMS AND METHODS FOR ROUTING ELECTRONIC TRANSACTIONS USING NETWORK SIMULATION AND FORECASTING

(71) Applicant: Worldpay, LLC, Symmes Township, OH (US)

(72) Inventors: Dennis Kettler, Mason, OH (US); Scott Wayne DeAngelo, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 136 days.

(21) Appl. No.: 18/463,856

(22) Filed: Sep. 8, 2023

(65) Prior Publication Data

US 2023/0419323 A1 Dec. 28, 2023

Related U.S. Application Data

(63) Continuation of application No. 18/061,721, filed on Dec. 5, 2022, now Pat. No. 11,790,362, which is a (Continued)

(51) Int. Cl.
*G06Q 20/34* (2012.01)
*G06Q 20/40* (2012.01)

(52) U.S. Cl.
CPC ......... *G06Q 20/4012* (2013.01); *G06Q 20/34* (2013.01)

(58) Field of Classification Search
CPC ........................... G06Q 20/4012; G06Q 20/34
See application file for complete search history.

(56) References Cited

U.S. PATENT DOCUMENTS 8,886,563 B2 11/2014 Sakata et al.
9,424,562 B2 8/2016 Dickelman
(Continued)

FOREIGN PATENT DOCUMENTS

CA 2754490 A1 * 9/2010 ............... G06F 8/34

OTHER PUBLICATIONS

Interchange Fees and Routing; Credit Union Magazine, Sep. 2011, vol. 77 (9), p. 48.*

*Primary Examiner* — Ilse I Immanuel
(74) *Attorney, Agent, or Firm* — Bookoff McAndrews, PLLC

(57) ABSTRACT

Systems and methods are for routing electronic payment transactions to PIN-less networks using payment pseudo-networks and electronic transaction simulation. One method comprises: receiving transaction-related information from a merchant, the transaction-related information including a bank identification number ("BIN"), one or more available network IDs, one or more merchant categories, an issuer regulatory status, a transaction amount, and a preferred status; extracting routing criteria from the received transaction-related information; dynamically identifying one or more eligible networks based on extracted routing criteria; dynamically identifying one or more breakeven transaction amounts for each identified eligible network, each breakeven transaction amount defining a point at which two or more eligible networks have the same expenses for a given transaction amount; and routing signature debit transactions from the merchant to a least cost PIN-less network selected from the eligible networks based on identification of a desired breakeven transaction amount for the PIN-less network.

20 Claims, 11 Drawing Sheets

| | |
|---|---|
| 1. | PSEUDO-NETWORK B |
| 2. | NETWORK C |
| 3. | PSEUDO-NETWORK A |
| 4. | NETWORK A |
| 5. | NETWORK D |
| 6. | NETWORK B |

Related U.S. Application Data continuation of application No. 17/213,934, filed on Mar. 26, 2021, now Pat. No. 11,551,218, which is a continuation of application No. 15/383,550, filed on Dec. 19, 2016, now Pat. No. 10,990,972.

(56) References Cited

U.S. PATENT DOCUMENTS

| | | | | |
|---|---|---|---|---|
| 9,852,407 | B2 * | 12/2017 | Masterson | G06Q 20/10 |
| 10,089,646 | B1 * | 10/2018 | Mohsenzadeh | G06Q 20/10 |
| 2011/0246358 | A1 | 10/2011 | Blackhurst et al. | |
| 2017/0083716 | A1 * | 3/2017 | Sun | H04L 9/14 |

* cited by examiner

| | |
|---|---|
| 1. | NETWORK A |
| 2. | NETWORK B |
| 3. | NETWORK C |
| 4. | NETWORK D |
| 5. | PSEUDO-NETWORK A |
| 6. | PSEUDO-NETWORK B |

| | |
|---|---|
| 1. | PSEUDO-NETWORK B |
| 2. | NETWORK C |
| 3. | PSEUDO-NETWORK A |
| 4. | NETWORK A |
| 5. | NETWORK D |
| 6. | NETWORK B |

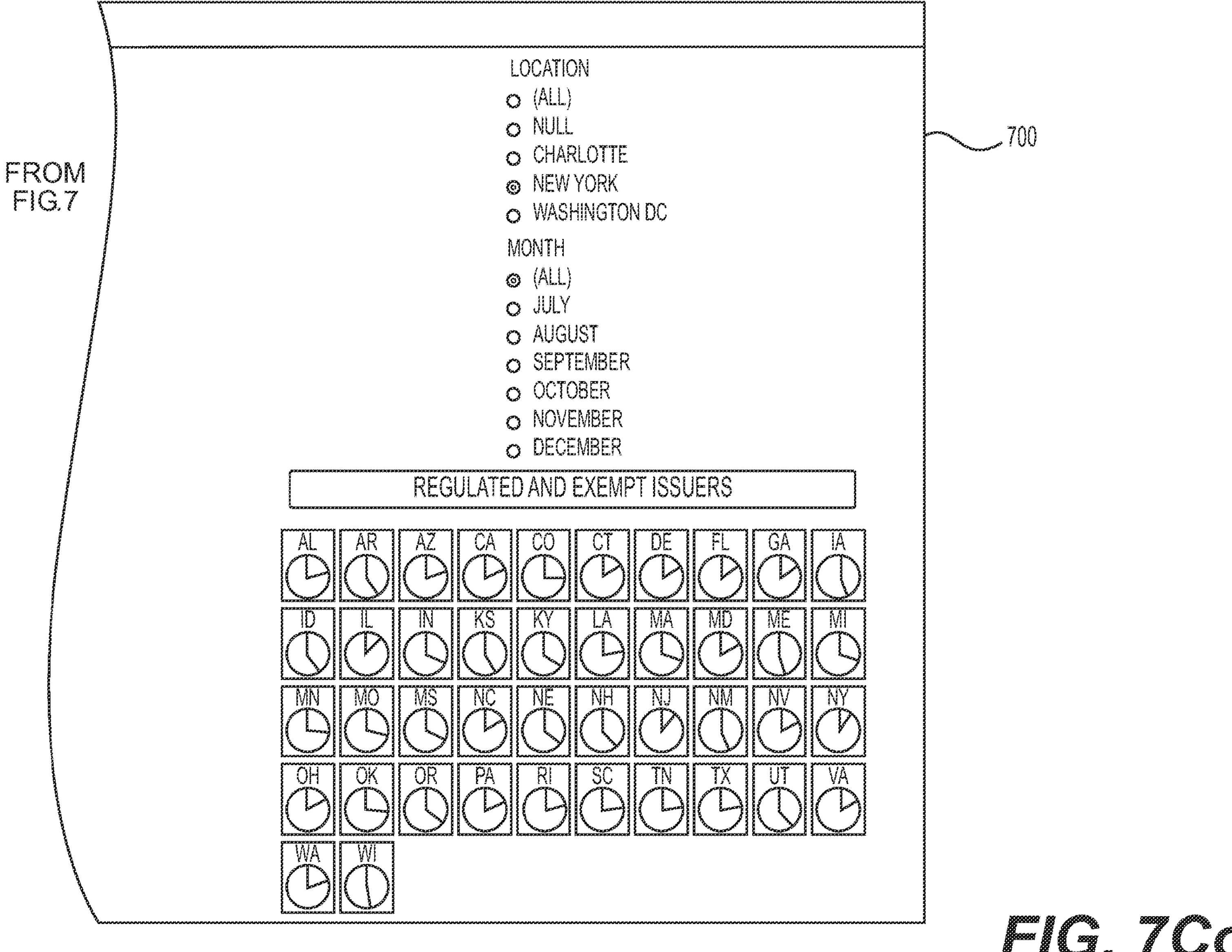
FIG. 7Cont.

SYSTEMS AND METHODS FOR ROUTING ELECTRONIC TRANSACTIONS USING NETWORK SIMULATION AND FORECASTING

CROSS-REFERENCE TO RELATED APPLICATION(S)

This patent application is a continuation of and claims the benefit of priority to U.S. application Ser. No. 18/061,721, filed on Dec. 5, 2022, which is a continuation of U.S. application Ser. No. 17/213,934, filed on Mar. 26, 2021, now U.S. Pat. No. 11,551,218, which is a continuation of U.S. application Ser. No. 15/383,550, filed on Dec. 19, 2016, now U.S. Pat. No. 10,990,972, the entireties of which are incorporated herein by reference.

FIELD OF DISCLOSURE

The present disclosure relates generally to the field of routing electronic payment transactions and, more particularly, to routing electronic payment transactions using payment pseudo-networks and electronic transaction simulation and forecasting.

BACKGROUND

In the world of payments, merchants, such as retailers and e-commerce sites, may choose various acquiring institutions or banks ("acquirers") to process payment transactions through the various payment networks used by consumers. The payment networks may include credit networks (e.g., Visa, Master Card, Discover, American Express, etc.) and/or debit networks (e.g., Star, Plus, Jeanie, Pulse, etc.). Consumer card issuers may decide which groups and types of networks to accept, and merchants may further determine which processors and networks to route transactions through.

Payment networks, in turn, may use a number of factors to determine the interchange category and/or interchange rate for a given transaction. Some of these factors may be controlled or influenced by the merchant, the factors including but not limited to, the processing method (e.g., card present and card-not-present), the Merchant Category Code (MCC), and transaction data. However, payment networks may also use factors that may be outside of the control of a merchant to determine the interchange category and/or interchange rate for a given transaction. These factors, which a merchant may not be able to control or influence include, but are not limited to, the card type (separate interchange categories exist for credit and debit as well as corporate cards, prepaid cards, etc.), the card brand (Visa, MasterCard, etc.), and/or the card owner (whether a credit or debit card is issued by a small credit union, regional bank or large National bank).

If a merchant has a large volume of transactions, then the savings from paying the lowest transaction fees could easily add up to hundreds of thousands of dollars per month. The ability to route transactions least cost is further complicated by cases where a merchant has multiple locations and/or multiple business lines per location in the case of multi-format retailer, such as a "big box store" (ex: photography section, salon section, vision section, electronics section, apparel section, etc., wherein each section may have its own MCC).

Furthermore, analyzing transaction costs and making routing decisions may be complicated by both (i) mandatory state and Federal regulatory rules and (ii) voluntary agreements among issuers, networks, and processors, any of which may pertain to negotiated transaction volume/amount thresholds, negotiated markup rates, exemption from regulations, and preferences. As an example, under the "Durbin amendment" of the Dodd-Frank financial reform legislation of 2010, financial institutions having over $10B in assets may be considered "regulated," whereas financial institutions having less than $10B in assets may be "exempt." Moreover, many Debit Networks (e.g. Star, Jeanie, etc.) create "preferred rates" that may be different from "standard rates," and these rates may change from merchant to merchant, and/or from issuer to issuer. As a result, when compiling a "rate sheet," it can be important to know which merchants or issuers are preferred, and what the preferred rates are. Many networks also charge not only based on "standard' vs. "preferred," but also regulated vs. exempt, and based on card type (prepaid, business, etc.) and transaction volumes/amounts over time.

Thus, while a static table of networks or issuers might provide some initial insights into costs, the real costs may depend on regulatory status and/or whether certain regulatory or contractual thresholds (maximums or minimums) have been reached in some given time period. Since actual costs or rates may depend on total numbers of transactions, it can be difficult to predict the real costs and/or the ideal routing for any given transaction.

Thus, there is a desire for a system and method for allowing merchants to automatically find the most desired networks through which to route electronic payment transactions, on a dynamic and granular level.

SUMMARY

According to certain aspects of the present disclosure, systems and methods are disclosed for routing electronic payment transactions to PIN-less networks using payment pseudo-networks and electronic transaction simulation.

In one embodiment, a computer-implemented method is disclosed for routing electronic payment transactions to PIN-less networks using payment pseudo-networks and electronic transaction simulation, the method comprising: receiving transaction-related information from a merchant, the transaction-related information including a bank identification number ("BIN"), one or more available payment network IDs, one or more merchant categories, an issuer regulatory status, a transaction amount, and a preferred status; extracting routing criteria from the received transaction-related information; dynamically identifying one or more eligible payment networks based on extracted transaction routing criteria; dynamically identifying one or more breakeven transaction amounts for each identified eligible network, each breakeven transaction amount defining a point at which two or more eligible networks have the same expenses for a given transaction amount; and routing signature debit transactions from the merchant to a least cost PIN-less network selected from the eligible networks based on identification of a desired breakeven transaction amount for the PIN-less debit network.

In accordance with another embodiment, a system is disclosed for routing electronic payment transactions to PIN-less networks using payment pseudo-networks and electronic transaction simulation, the system comprising: a data storage device storing instructions for routing electronic payment transactions to PIN-less networks using payment pseudo-networks and electronic transaction simulation in an electronic storage medium; and a processor configured to execute the instructions to perform a method including: receiving transaction-related information from a merchant, the transaction-related information including a bank identification number ("BIN"), one or more available payment network IDs, one or more merchant categories, an issuer regulatory status, a transaction amount, and a preferred status; extracting routing criteria from the received transaction-related information; dynamically identifying one or more eligible payment networks based on extracted transaction routing criteria; dynamically identifying one or more breakeven transaction amounts for each identified eligible network, each breakeven transaction amount defining a point at which two or more eligible networks have the same expenses for a given transaction amount; and routing signature debit transactions from the merchant to a least cost PIN-less network selected from the eligible networks based on identification of a desired breakeven transaction amount for the PIN-less debit network.

In accordance with another embodiment, a non-transitory machine-readable medium storing instructions that, when executed by the a computing system, causes the computing system to perform a method for routing electronic payment transactions to PIN-less networks using payment pseudo-networks and electronic transaction simulation, the method including: receiving transaction-related information from a merchant, the transaction-related information including a bank identification number ("BIN"), one or more available payment network IDs, one or more merchant categories, an issuer regulatory status, a transaction amount, and a preferred status; extracting routing criteria from the received transaction-related information; dynamically identifying one or more eligible payment networks based on extracted transaction routing criteria; dynamically identifying one or more breakeven transaction amounts for each identified eligible network, each breakeven transaction amount defining a point at which two or more eligible networks have the same expenses for a given transaction amount; and routing signature debit transactions from the merchant to a least cost PIN-less network selected from the eligible networks based on identification of a desired breakeven transaction amount for the PIN-less debit network.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
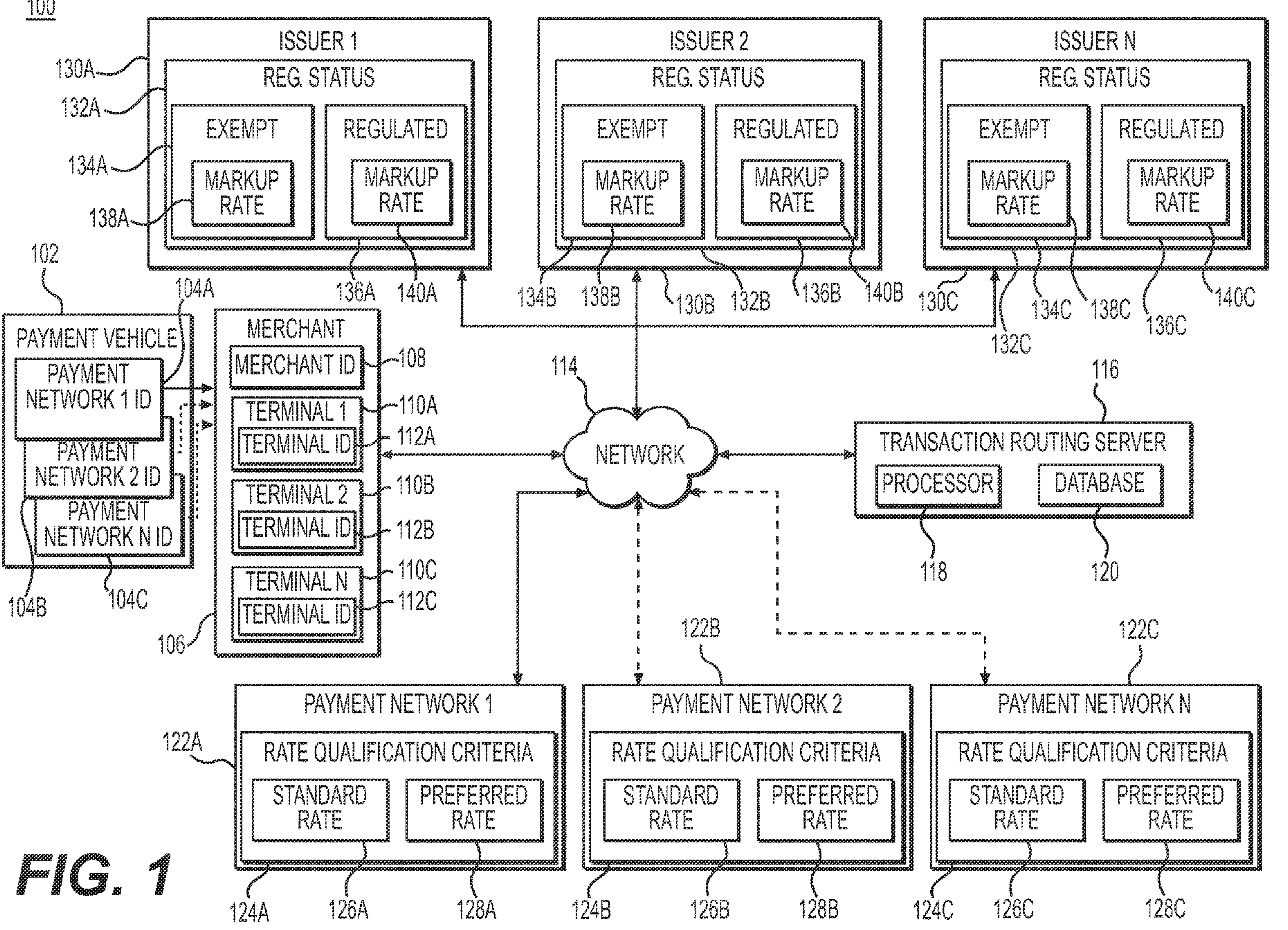
FIG. 1 depicts a block diagram of an example environment and systems for routing electronic payment transactions, in accordance with non-limiting embodiments.

Various non-limiting embodiments of the present disclosure will now be described to provide an overall understanding of the principles of the structure, function, and use of systems and methods disclosed herein for routing electronic payment transactions using payment pseudo-networks and electronic transaction simulation.

As described above, in some cases, analyzing transaction costs and making routing decisions may be complicated by both (i) mandatory regulatory rules and (ii) voluntary agreements among issuers, networks, and processors, any of which may pertain to transaction volume, markup rates, exemption from regulations, and preferences. As an example, financial institutions having over $10B in assets may be considered "regulated" under Durbin, whereas financial institutions having less than $10B in assets may be "exempt." Moreover, many processors create "preferred rates" that may be different from "standard rates," and these rates may change from merchant to merchant, and/or from issuer to issuer. As a result, when compiling a "rate sheet," it can be important to know which merchants or issuers are preferred, and what the preferred rates are. Many networks also change not only based on "standard' vs. "preferred," but also regulated vs. exempt, and based on card type (prepaid, business, etc.).

Thus, while a static table of networks or issuers might provide some initial insights into costs, the real costs may depend on regulatory status and/or whether certain regulatory or contractual thresholds (maximums or minimums) have been reached in some given time period. Since actual costs or rates may depend on total numbers of transactions, it can be difficult to predict the real costs and/or the ideal routing for any given transaction.

In view of the foregoing, the present disclosure describes embodiments of a transaction routing server configured to generate "pseudo-networks" designed to be compared against networks when performing decisioning within a rate sheet of networks. "Pseudo-networks" may be artificial networks or modified versions of networks and configured to simulate routing options within the payments environment. Specifically, the disclosed embodiments involve generating pseudo-networks mimicking actual payment networks, and generating and updating routing tables reflecting forecasted routing transaction costs to ensure desired transaction volumes are being achieved while minimizing acceptance costs. The present disclosure also describes embodiments of a transaction routing server configured to perform simulation and forecasting of transaction routing. For example, the disclosed embodiments also involve simulating and forecasting transactions for the purpose of comparing data against historical data, and forecasting volume against negotiated thresholds.

Thus, the present disclosure is directed to a proprietary, comprehensive solution for routing electronic payment transactions using payment pseudo-networks and electronic transaction simulation. Moreover, the embodiments of the present disclosure enhance transaction routing intelligence and reduce the cost of acceptance.

As will be described in more detail below, the presently disclosed systems and methods may route and optimize transactions according to one or more of the following factors: merchant category code (MCC), regulatory (e.g., Durbin) qualification, transaction amount, full acceptance cost (e.g., I/C, switch, other, etc.), identification of standard/premier issuer status, identification of business vs. prepaid cards, BIN/network identification, and/or interchange monitoring/forecasting.

The disclosed embodiments are relevant to any type of credit and/or debit transactions, including both PIN and PIN-less, and are designed to reduce expenses while also optimizing across various dimensions according to various desires. As disclosed herein, the present techniques also include electronic displays for purposes of real-time reporting, monthly reporting, annual reporting, and the like, for reflecting to clients the savings resulting from the presently disclosed routing techniques. The disclosed routing techniques also involve "PIN prompting," which reduces acceptance costs by steering consumers away from signature transactions to PIN debit transactions, and seamlessly routing signature debit transactions to least-cost PIN-less debit networks.

As described above, the present disclosure is directed to both PIN and PIN-less transactions that reach a processor upon swiping, dipping, EMV, etc. initiation of a payment transaction. It should be appreciated that a payment processor may route each transaction to any of a number of different networks including Interlink (VISA), Maestro (MC), Pulse (Disc), Star (First Data), Accel, etc. In many cases, as a transaction is received, the processor may receive the primary account number ("PAN"), time/date stamp, amount, MCC, and determine the issuer by analyzing the received PAN and determined which network or networks are enabled by the given issuer (e.g., a given issuer may have enabled, e.g., Interlink, Star, and Accel). According to the embodiments of the present disclosure, additional routing analysis and decisioning may be performed to determine, in real-time, the actual cost of a given transaction, based on one or more factors or criteria. For example, a transaction routing server consistent with the disclosed embodiments may receive transactions and extract routing criteria comprising, category code, ticket amount, and so on.

The cost of fees charged by acquirers and networks for payment transactions may impose significant costs on merchants, especially for large volumes of transactions. It may also be burdensome or otherwise impossible, to date, for a merchant, to sign up for and, at every payment transaction, search for, the least cost acquirer, network, and/or pricing model, or be able to manage the communication of transaction information between payment terminals, acquirer processors, and networks, especially when there are different messaging formats used by the payment terminals or networks.

Thus, the embodiments of the present disclosure are also directed to methods and systems to identify and achieve the lowest cost for each purchase transaction initiated by a merchant through the creation of a marketplace model. The marketplace model may include a computing system, which may include a "transaction routing server" that selects, from among a marketplace of networks, a network that provides the "least cost" (e.g., lowest cost) acceptance or mark-up rate. Furthermore, various embodiments of the present disclosure describe systems and methods for enabling the transaction routing server to communicate and network efficiently between various payment terminals, and a plurality of networks.

One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example environment and systems for routing electronic payment transactions to PIN-less debit networks and dynamically routing electronic payment transactions using payment pseudo-networks and electronic transaction simulation. It should be appreciated that the embodiments of the present disclosure, including FIG. 1, are also applicable to PIN debit and credit networks. At a high level, the transaction routing environment and systems ("system") 100 comprises: a payment vehicle 102 being used at a merchant 106 via a terminal 110A-C; a computing system ("transaction routing server" 116) that selects from among a marketplace of payment networks 122A-122C; a plurality of issuers 130A-130C; and a network 114 (e.g., the wired or wireless Internet, LAN, and/or PSTN) that may enable communication between the various systems and entities. In some embodiments, certain rate qualification criteria 124A-124C, as determined by various payment networks 122A-122C may be used to map an appropriate regulatory status 132A-132C of an issuer 130A-130C to standard rates 126A-126C vs. preferred rates 128A-128C for a given issuer or merchant.

Still referring to FIG. 1, the payment vehicle 102 may be a tangible object (e.g., a credit card, debit card, gift card, etc.), an electronic device (e.g., in the case of ApplePay, Samsung Pay, Bitcoin, or the like), and/or an intangible representation of a user's payment source that may be used to initiate a payment transaction at a payment terminal 110A-110C of a merchant 106 by delivering information regarding the consumer's payment source (e.g., payment network 1 ID 104A, payment network 2 ID 104B, . . . payment network N ID 104C, etc.). It is also contemplated that for some merchants (e.g., e-commerce merchants), there may not be a physical terminal. In such embodiments, a merchant's server may serve as a terminal and the server may or may not have and/or send a terminal identifier. The payment vehicle may carry information of a payment network (e.g., Visa, MasterCard, Discover, American Express, JCB, etc., for credit networks, and/or Star, Plus, Jeanie, Cirrus, etc., for debit networks) using a payment network identification 104A-104C. The payment network identification may include one or more of a payment card number, an issuer identification number, a primary account number (PAN), a bank card number, and/or a bank identifier code of a payment source account. A consumer may initiate a payment transaction at a terminal, for example, by swiping a card and/or otherwise facilitating the transmission of payment network identification (e.g., electronically, verbally, etc.).

Still referring to FIG. 1, a merchant 106 may refer generally to any type of retailer, service provider, or any other type of business that is in networked communication with one or more issuers (e.g., Issuer 1 130A, Issuer 2 130B, . . . Issuer N 130C, etc.) and may use the payment processing services of the respective, acquirers, issuers, and/or unaffiliated processors/networks. Payment processing services may include receiving and responding to authorization requests as well as facilitating the settlement of funds associated with card-based transactions occurring at merchant 106. One or more terminals (e.g., Terminal 1 110A, Terminal 2 110B, . . . Terminal N 110C, etc.) may be mapped to merchant 106. As is known in the art, each terminal 110A-110C may be generally unmodified or "stock" and simply facilitate the standard transmission of transaction-related information to the computing system of an acquirer 130A-130C. In various embodiments of the present disclosure, the transaction routing server 116 may act or be perceived by the terminals as either an issuer or an acquirer processor computer system. Thus, each terminal 110A-C may facilitate the transmission of transaction-related information to the transaction routing server 116. The transaction-related information may comprise a transaction authorization request ("authorization request"), including but not limited to, a payment amount, a date, a time, a payment network identification (e.g., a primary account number and/or issuer identification number) as well as other types of identifying indicia (e.g., merchant identification 108, terminal identification 112A-C, etc.). The identifying indicia may vary based on the terminal 112A-C, the type of merchant 106, or the payment network being used at the terminal.

Still referring to FIG. 1, the network 114 may serve as a means for communicating information across the various systems and entities of the electronic transaction routing system and environment. For example, in some embodiments, the network may facilitate the transmission of payment transaction information as well as identifying information of the merchant, terminal, and payment network used, to the transaction routing server via the cloud, e.g., the Internet, or any type of wired or wireless wide area network. Network 114 may facilitate the periodic or continual updating of the transaction routing server 116 on payment network interchange rates from various computing systems, as well as the markup rates for various acquirers from the computing systems of the respective acquirer institutions.

Still referring to FIG. 1, transaction routing server 116 may be a computing system comprising at least one processor 118 and at least one data storage device, e.g., database 120. In some embodiments, the transaction routing server 116 may receive information from the merchant 106 and/or terminals 110A-C, maintain a database 120 of stored information related to payment networks, issuers, regulatory status, rate qualification criteria, etc., periodically or continually update its database 120, and transmit information back to merchant 106 and/or terminals 110A-C. Upon the initiation of a payment transaction at a terminal 110A-C, the transaction routing server 116 may receive various transaction related information, which may include, but is not limited to, a BIN, identifications of available payment networks useable in the transaction ("payment network IDs"), merchant categories, regulatory status, transaction amount, "preferred" or "premier" status, etc. In some embodiments, the payment network identification may include a payment card number, whose first six digits may identify an issuer and/or bank institution that is associated with a payment network.

Still referring to FIG. 1, upon receiving the transaction-related information, the transaction routing server 116 may use the extracted payment network identification to determine which payment networks a transaction may be use (e.g., payment network 1 122A, payment network 2 122B, payment network 3 122C). Depending on the payment networks available, transaction routing server 116 may subsequently use that payment network's rate qualification criteria 124A-124C to determine the standard rates 126A-126C vs. preferred rates 128A-128C for the transaction. In some embodiments, transaction routing server 116 may also use the rate qualification criteria 124A-124C to determine information about the relevant issuer, such as a regulatory status 132A-132C. In some embodiments, the regulatory status is determined by the identity of the issuer (e.g., more or less than $10B in assets), whereas the standard vs. preferred rate is determined by the payment network.

Thus, transaction routing server 116 is configured to evaluate and select, from one of many networks (e.g., Payment Network 1 122A, Payment Network 2 122B, . . . Payment Network N 122C, etc.), a payment network that may yield the least cost markup rate for a given transaction. In some embodiments, this selection may include comparing the markup rates within various pricing models for each of the acquirers, selecting the pricing model yielding the lowest markup rate, for each of the acquirers, identifying networks with the lowest rates for a given standard vs. preferred status, and a given regulatory exemption status, and then selecting the lowest interchange, "acceptance," and/or "markup" rate among all of the networks.

Still referring to FIG. 1, in summary, once transaction routing server 116 receives the transaction-related information from a terminal 110A-C via network 114, the transaction routing server 116 may retrieve, from its database 120, the available rate information based on the rate qualification criteria of the payment networks available to be used in the transaction. For example, if the transaction routing server identifies, based on the issuer ID and/or payment network ID provided in the received transaction-related information that payment network 1 122A is being utilized, transaction routing server 116 may retrieve, from its database 120, a list of eligible or available alternative payment networks, their respective rate qualification criteria, their standard vs. preferred rates, and the issuer's regulatory status as either "exempt" or "regulated." Subsequently, transaction routing server 116 may determine, from one of many networks 122A-122C, the network that provides the overall best solution for the merchant, whether or not that network is actually the least costly for any given transaction. In some embodiments, the markup rates for the various networks and merchants may be stored within database 120 of transaction routing server 116. The database 120 may be continually and/or periodically updated by computing systems or servers representing the one or more issuers 130A-130C.

Still referring to FIG. 1, once transaction routing server 116 determines a matrix of various markup rates across issuers and networks, transaction routing server 116 may determine the total rate that would be incurred by the merchant for the transaction. Typically, the markup rate and/or the acceptance rate may be determined to be one or more of a percentage of the transaction amount, a flat charge, or a value amount added to a percentage of the transaction amount. Once the acceptance rate and the least cost markup rate has been identified (e.g., from the decision-making process depicted in FIGS. 2A and/or 2B), the rates may be combined and/or may be sent along with the transaction-related information to the selected issuer or network with the least cost markup rate for further processing of the payment transaction. In some embodiments, the combined rates along with information related to or identifying the selected network may be sent back to the payment terminal of the merchant or a computing system of the merchant. In other embodiments, after the combined rates along with transaction-related information has been sent to the selected network with the least cost rate and the payment transaction has been further processed, the acquirer may send information ("transaction processing acknowledgment information") acknowledging the processing of the transaction back to transaction routing server 116. In such embodiments, transaction routing server 116 may communicate the transaction processing acknowledgment information to merchant 106 and/or payment terminal 110A-110C of the merchant.

Since the various payment terminals and servers associated with the plurality of merchants, acquirers, acquirer processors, and/or payment networks, with which the marketplace transmits and/or receives information, may use different messaging formats, it is envisioned that in various embodiments of the present disclosure, the transaction routing server 116 has the ability to translate between and/or support platforms of various messaging formats. For example, if a payment terminal communicates transaction related information in JSON but acquirer 1 communicates information regarding the transaction in XML, the transaction routing server may receive the information regarding the transaction from acquirer 1 in XML, translate the information to JSON, and deliver the information to the payment terminal in JSON. In some embodiments, the task of translating messages of various formats into a format readable by the recipient device (e.g., terminal) may be performed by processor 118 of transaction routing server 116.

Figure 2A:
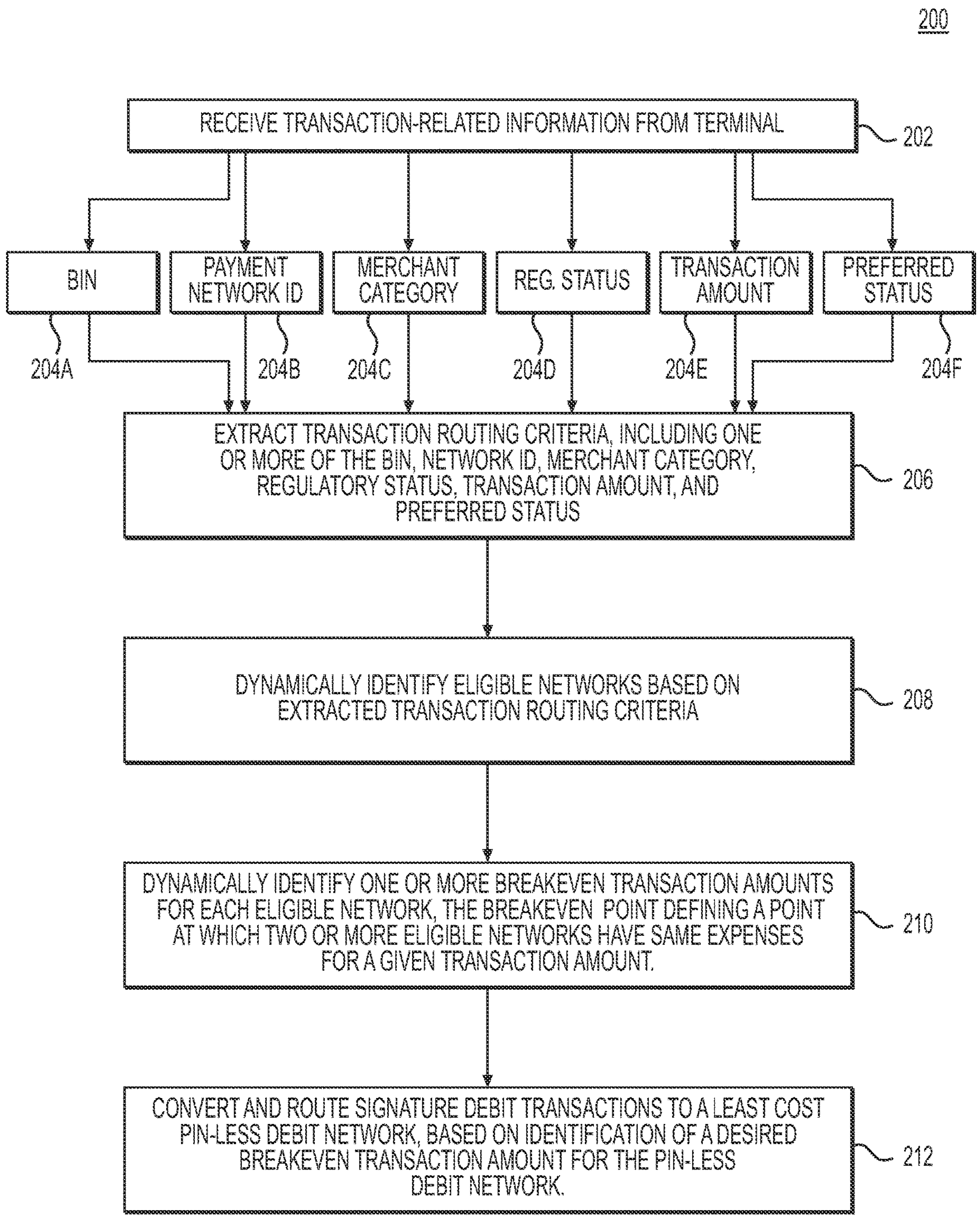
FIG. 2A depicts a flow diagram of an exemplary method executed by a transaction routing server for routing electronic payment transactions to PIN-less debit networks based on dynamic routing, in accordance with non-limiting embodiments.

FIG. 2A depicts a flow diagram of an exemplary method executed by a transaction routing server for routing electronic payment transactions to PIN-less debit networks based on dynamic routing, in accordance with non-limiting embodiments. Specifically, FIG. 2A depicts a method of routing a transaction over a PIN-debit network even if a PIN is not present, by leveraging a relationship with the issuer. Such techniques may be performed by adding "signature transactions" as separate networks in the sequencing of available networks and pseudo-networks. For example, a decision may be made on whether to send a given transaction through credit networks or through PIN debit rails.

Specifically, FIG. 2A depicts a method 200 for routing electronic payment transactions to PIN-less networks using payment pseudo-networks and electronic transaction simulation. In one embodiment, method 200 includes step 202, which may include receiving transaction-related information from a terminal. As illustrated in steps 204A-204F, the transaction-related information may include an issuing or "issuer" bank identification number ("BIN") 204A, an identification of the available payment networks ("payment network IDs") 204B, an identification of one or more merchant categories 204C, an identification of a regulatory status of the issuer (issuing bank) 204D, the transaction amount charged or to be charged 204E, and a preferred (or non-preferred) status 204F associated with the merchant affiliated with the transaction. In some embodiments, for example in transactions involving e-commerce, or an online purchase, the transaction-related information need not include a terminal ID, e.g., where a physical terminal does not exist. The modes and/or forms of payment may include, but are not limited to, the type of card presented, the specific information contained in the transaction, how and when a payment transaction is processed, the industry of the merchant, whether additional services (e.g., address verification service (AVS)) are utilized, etc.

Step 206 may include extracting routing criteria from the transaction-related information, including but not limited to the BIN 204A, available payment network IDs 204B, merchant categories 204C, issuer regulatory status 204D, transaction amount 204E, and preferred status 204F. In some embodiments, a default or initial payment network may be identified from the first digit of the payment card number and/or a bank card number (e.g., Visa, MasterCard, Discover, American Express, JCB, etc., for credit networks, and/or Star, Plus, Genie, Cirrus, etc., for debit networks).

Step 208 may include dynamically identifying eligible networks based on extracted transaction routing criteria. For example, step 208 may include identifying eligible networks based on the identity of the cardholder's issuing bank and/or the identity and/or category of the relevant merchant corresponding to the transaction.

Step 210 may include dynamically identifying one or more breakeven transaction amounts for which each eligible network. In some embodiments, the breakeven point may define a point at which two or more eligible networks have the same expenses for a given transaction amount.

Step 212 may include routing signature debit transactions to a least cost PIN-less network. In some embodiments, signature debit transactions may be converted and routed to a least cost PIN-less network based on identification of a desired breakeven transaction amount for the PIN-less debit network. For example, in one embodiment, step 212 may involve routing signature debit transaction to PIN-less networks by leveraging a processor's relationship with a given network, or between a merchant and a network. Specifically, eligible transactions may be determined based on BIN and organization ID. For example, a particular BIN may be used for PIN-less network eligibility (accounting for large percentages of total network volume), and organization ID ("Org ID") may be used to set thresholds for eligibility, such as a minimum of $X MM in annual sales and a maximum of 0.x % chargeback rate. Such chargeback rate thresholding may be used as a proxy for e-commerce eligibility and/or risk profile analysis. In another embodiment, step 212 may involve "PIN prompting," which reduces acceptance costs by shifting signature transactions to PIN debit transactions, and seamlessly routing signature debit transactions to least-cost PIN-less debit networks.

Figure 2B:
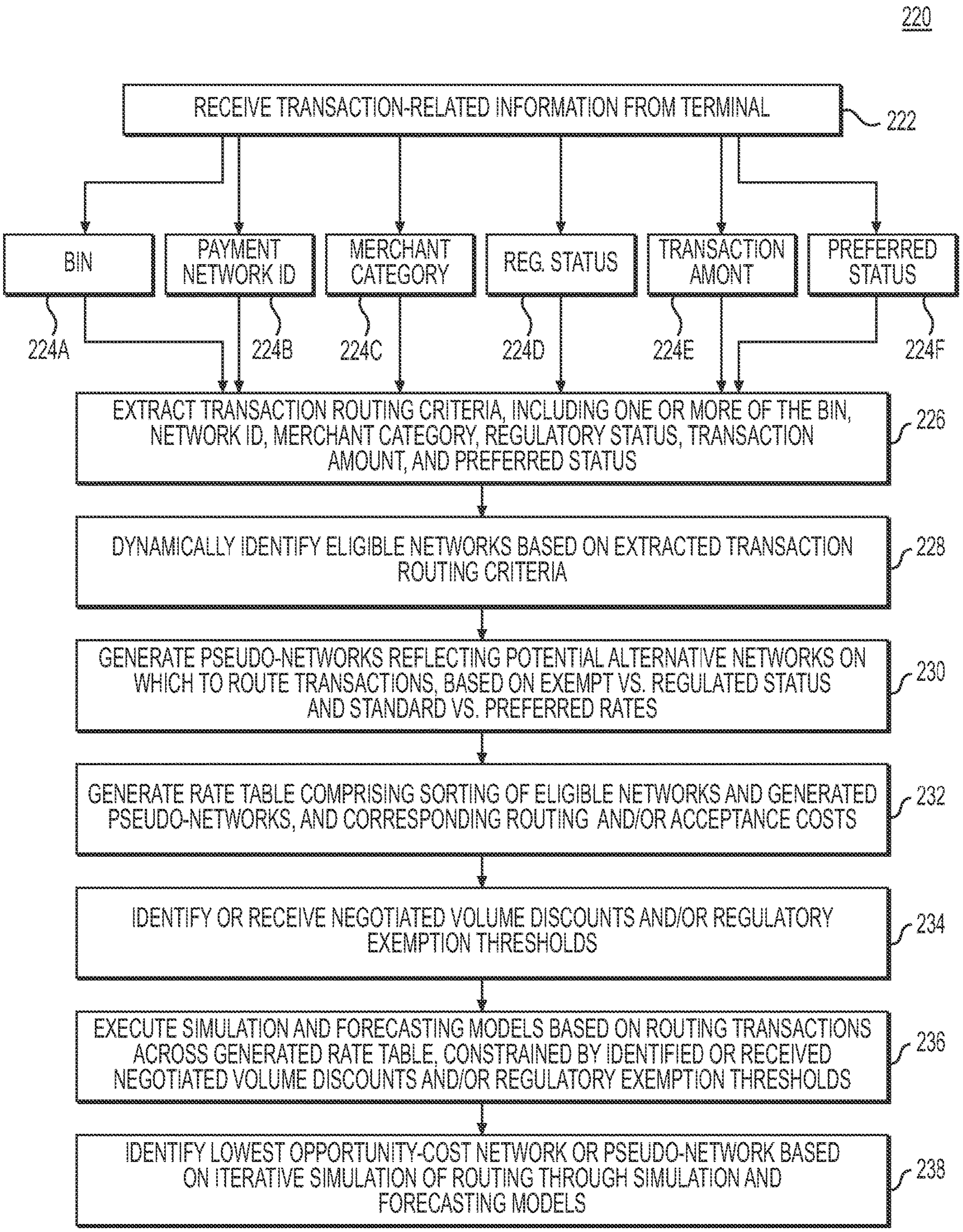
FIG. 2B depicts a flow diagram of an exemplary method executed by a transaction routing server for routing electronic payment transactions using payment pseudo-networks and electronic transaction simulation and forecasting, in accordance with non-limiting embodiments.

FIG. 2B depicts a flow diagram of an exemplary method executed by a transaction routing server for routing electronic payment transactions using payment pseudo-networks and electronic transaction simulation and forecasting, in accordance with non-limiting embodiments. Specifically, FIG. 2B depicts a method 220 for routing electronic payment transactions using payment pseudo-networks and electronic transaction simulation, forecasting, and iteration. In one embodiment, method 220 includes step 222, which may include receiving transaction-related information from a terminal. As illustrated in steps 224A-224F, the transaction-related information may include an issuing or "issuer" bank identification number ("BIN") 224A, an identification of the available payment networks ("payment network IDs") 224B, an identification of one or more merchant categories 224C, an identification of a regulatory status of the issuer (issuing bank) 224D, the transaction amount charged or to be charged 224E, and a preferred (or non-preferred) status 224F associated with the merchant affiliated with the transaction. In some embodiments, for example in transactions involving e-commerce, or an online purchase, the transaction-related information need not include a terminal ID, e.g., where a physical terminal does not exist. The modes and/or forms of payment may include, but are not limited to, the type of card presented, the specific information contained in the transaction, how and when a payment transaction is processed, the industry of the merchant, whether additional services (e.g., address verification service (AVS)) are utilized, etc.

Step 226 may include extracting routing criteria from the transaction-related information, including but not limited to the BIN 224A, available payment network IDs 224B, merchant categories 224C, issuer regulatory status 224D, transaction amount 224E, and preferred status 224F. In some embodiments, a default or initial payment network may be identified from the first digit of the payment card number and/or a bank card number (e.g., Visa, MasterCard, Discover, American Express, JCB, etc., for credit networks, and/or Star, Plus, Genie, Cirrus, etc., for debit networks).

Step 228 may include dynamically identifying eligible networks based on extracted transaction routing criteria. For example, step 208 may include identifying eligible networks based on the identity of the cardholder's issuing bank and/or the identity and/or category of the relevant merchant corresponding to the transaction.

Step 230 may include generating pseudo-networks reflecting potential alternative networks on which to route transaction. In some embodiments, pseudo-networks may be generated based on exempt vs. regulated status and standard vs. preferred rates.

Step 232 may include generating one or more rate tables comprising a sorting of eligible networks and generated pseudo-networks, and corresponding routing and/or acceptance costs.

Step 234 may include identifying or receiving negotiated volume discounts and/or regulatory exemption thresholds. For example, in some cases, merchants, processors, and/or networks may negotiate preferred rates and/or volume discounts for given transaction amounts or transaction volumes. Thus, step 234 may comprise receiving information about negotiated volume discounts and/or regulatory exemption thresholds.

Step 236 may include executing simulation and forecasting models based on routing transactions across the one or more generated rate tables, constrained by the identified or received negotiated volume discounts and/or regulatory exemption thresholds. Step 238 may include identifying a lowest opportunity-cost network or pseudo-network based on iterative simulation of routing through the simulation and forecasting models.

For example, as will be discussed with respect to FIG. 3 below, one or more of an iterative algorithm 308, simulation module 304, and forecasting module 306 may be configured to interact to accurately forecast the absolute dollar amount of routing, and minimize the opportunity cost of pulling transactions from one network and routing them through another alternative network (e.g., a created pseudo-network), so as to reach negotiated volume discounts, comply with regulatory rules, leverage preferred rates, and reach other important technical and business goals. As an example, it may be the case that a given merchant falls short of a negotiated volume rate by $1 M. In such a case, it may be worth sending additional transactions to that network in a non-least-cost manner, just in order to get that volume discount.

Figure 3:
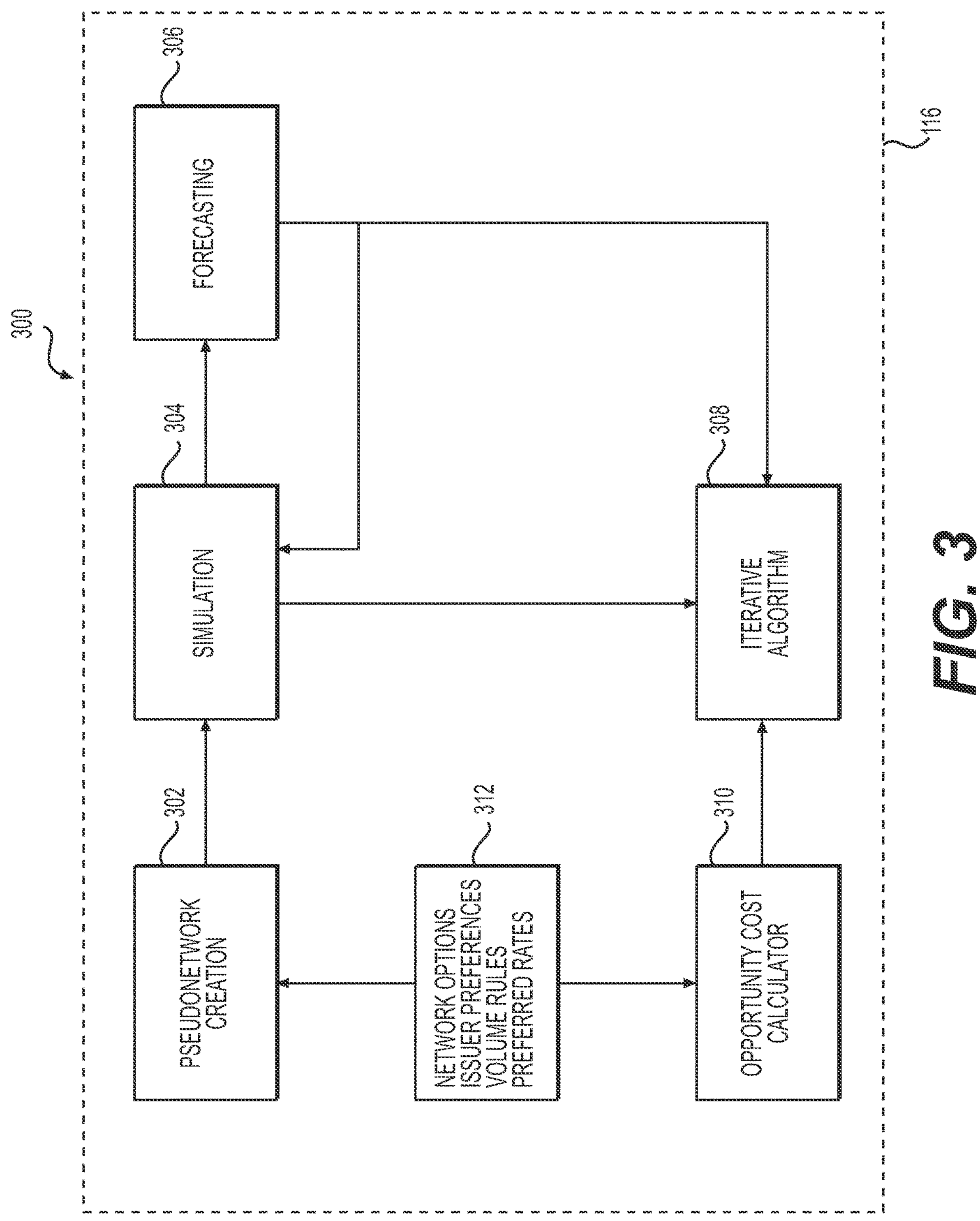
FIG. 3 depicts a plurality of modules and/or sub-systems of the transaction routing server of FIG. 1, for routing electronic payment transactions to PIN-less debit networks and dynamically routing electronic payment transactions using payment pseudo-networks and electronic transaction simulation, in accordance with non-limiting embodiments.

FIG. 3 depicts a schematic diagram 300 of a plurality of modules and/or sub-systems of the transaction routing server 116 of FIG. 1, for routing electronic payment transactions to PIN-less debit networks and dynamically routing electronic payment transactions using payment pseudo-networks and electronic transaction simulation, in accordance with non-limiting embodiments. Specifically, transaction routing server 116 may include a pseudo-network creation module 302, a simulation module 304, a forecasting module 306, an iterative algorithm module 308, an opportunity cost calculator 310, and a parameter/threshold source 312 for obtaining and disseminating, e.g., network options, issuer preferences, volume rules/agreements, preferred rates, regulatory rules, etc. As shown in FIG. 3, at a high level, parameter/threshold source 312 may obtain and disseminate parameters and thresholds, e.g., network options, issuer preferences, volume rules/agreements, preferred rates, regulatory rules, etc. to the pseudo-network creation module 302 and the opportunity cost calculator 310. Results of simulation module 304 may be fed into forecasting module 306 and iterative algorithm 308. Results of forecasting module 306 may be fed into iterative algorithm 308 and back into simulation module 304.

In one embodiment, pseudo-network creation module 302 may be configured to identify and generate new pseudo-networks to be included in rate tables and compared to existing payment networks in a dynamic routing algorithm. In one embodiment, pseudo-network creation module 302 may account for "standard" vs. "preferred" and card type, which enables creation of a full and realistic table of the available rates. Moreover, pseudo-network creation module 302 may incorporate each of: signature debit networks, PIN debit networks, PIN-less debit networks, and credit networks (including chip-credit networks).

In one embodiment, simulation module 304 and forecasting module 306 may interact to simulate transaction routing over a period of time, such as over a day, week, month, quarter, year, and so on. Thus, simulation module 304 may be configured to implement and analyze the generated tables of networks and pseudo-networks, and determine what total dollar value thresholds are achieved, and so on. Forecasting module 306 may thereby predict year-over-year growth, and predict other targets, thresholds, and metrics over time, using results of simulation module 304.

Iterative algorithm 308 may be configured to receive inputs from simulation module 304 and forecasting module 306, as well as opportunity cost calculator 310 to determine which transaction to run in a non-least-cost manner that will ultimately achieve better long-term goals. For example, one or more of iterative algorithm 308, simulation module 304, and forecasting module 306 may be configured to interact to accurately forecast the absolute dollar amount of routing, and minimize the opportunity cost of pulling transactions from one network and routing them through another alternative network (e.g., a created pseudo-network), so as to reach negotiated volume discounts, comply with regulatory rules, leverage preferred rates, and reach other important technical and business goals. As an example, it may be the case that a given merchant falls short of a negotiated volume rate by $1 M. In such a case, it may be worth sending additional transactions to that network in a non-least-cost manner, just in order to get that volume discount. Iterative algorithm 308, simulation module 304, and forecasting module 306 may be configured to determine which merchant's transactions and/or which other network's transactions to route in order to achieve the desired volume discount.

Figure 4A:
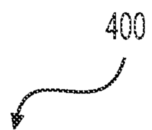
FIG. 4A depicts a table of payment networks including created pseudo-networks, in accordance with non-limiting embodiments.
Figure 4A:

FIG. 4A depicts a table of payment networks including created pseudo-networks, in accordance with non-limiting embodiments.

Figure 4B:
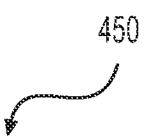
FIG. 4B depicts a table of payment networks including created pseudo-networks, sorted according to a simulated forecast of transaction volume and rates, in accordance with non-limiting embodiments.

FIG. 4B depicts a table of payment networks including created pseudo-networks, sorted according to a simulated forecast of transaction volume and rates, in accordance with non-limiting embodiments.

Figure 5:
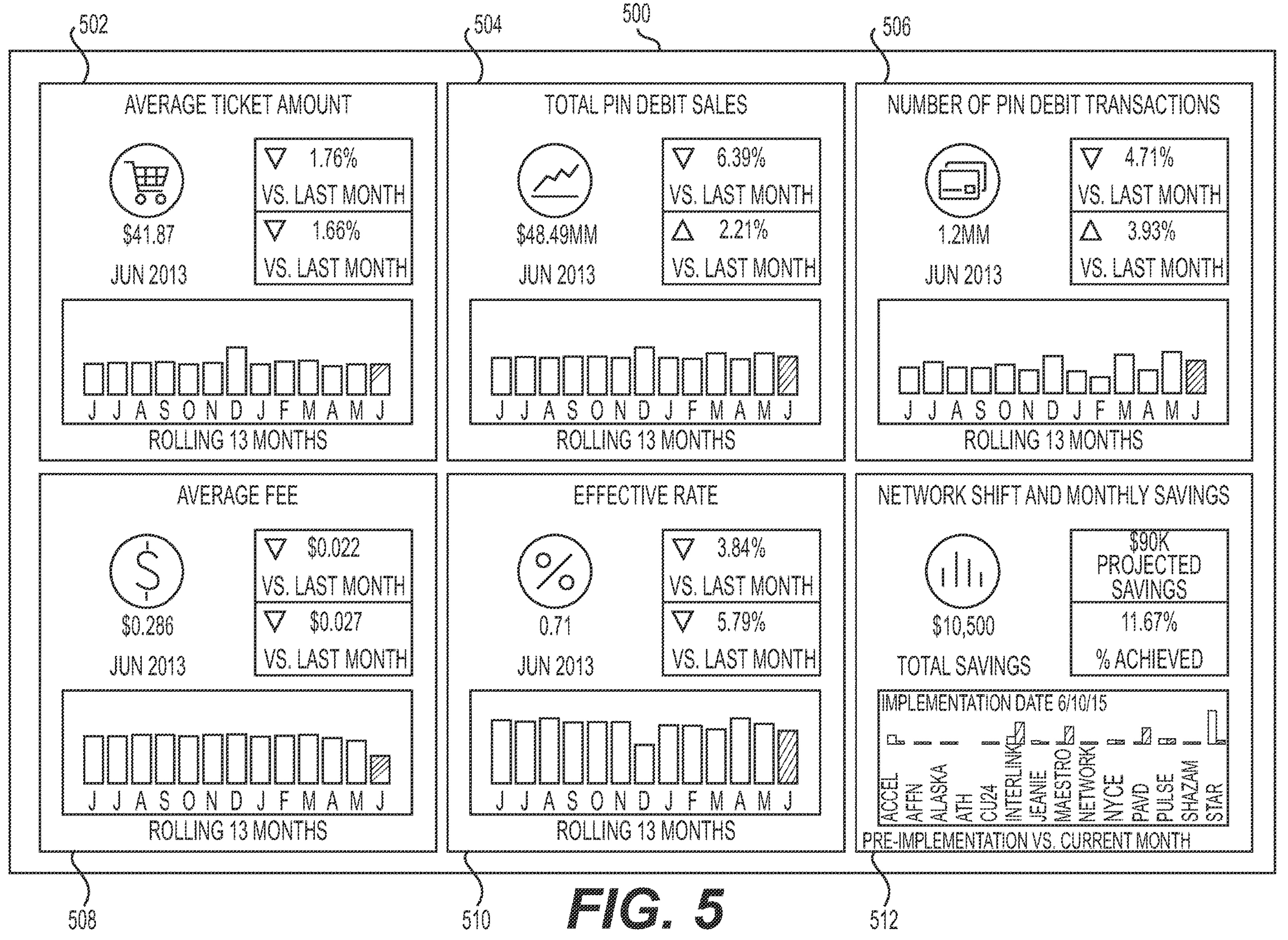
FIG. 5 depicts a screenshot of an exemplary user interface for displaying results of routing electronic payment transactions using payment pseudo-networks and electronic transaction simulation, and transaction forecasting and iteration.

FIG. 5 depicts a screenshot of an exemplary user interface for displaying results of routing electronic payment transactions using payment pseudo-networks and electronic transaction simulation, and transaction forecasting and iteration.

Figures 6A, 6B:
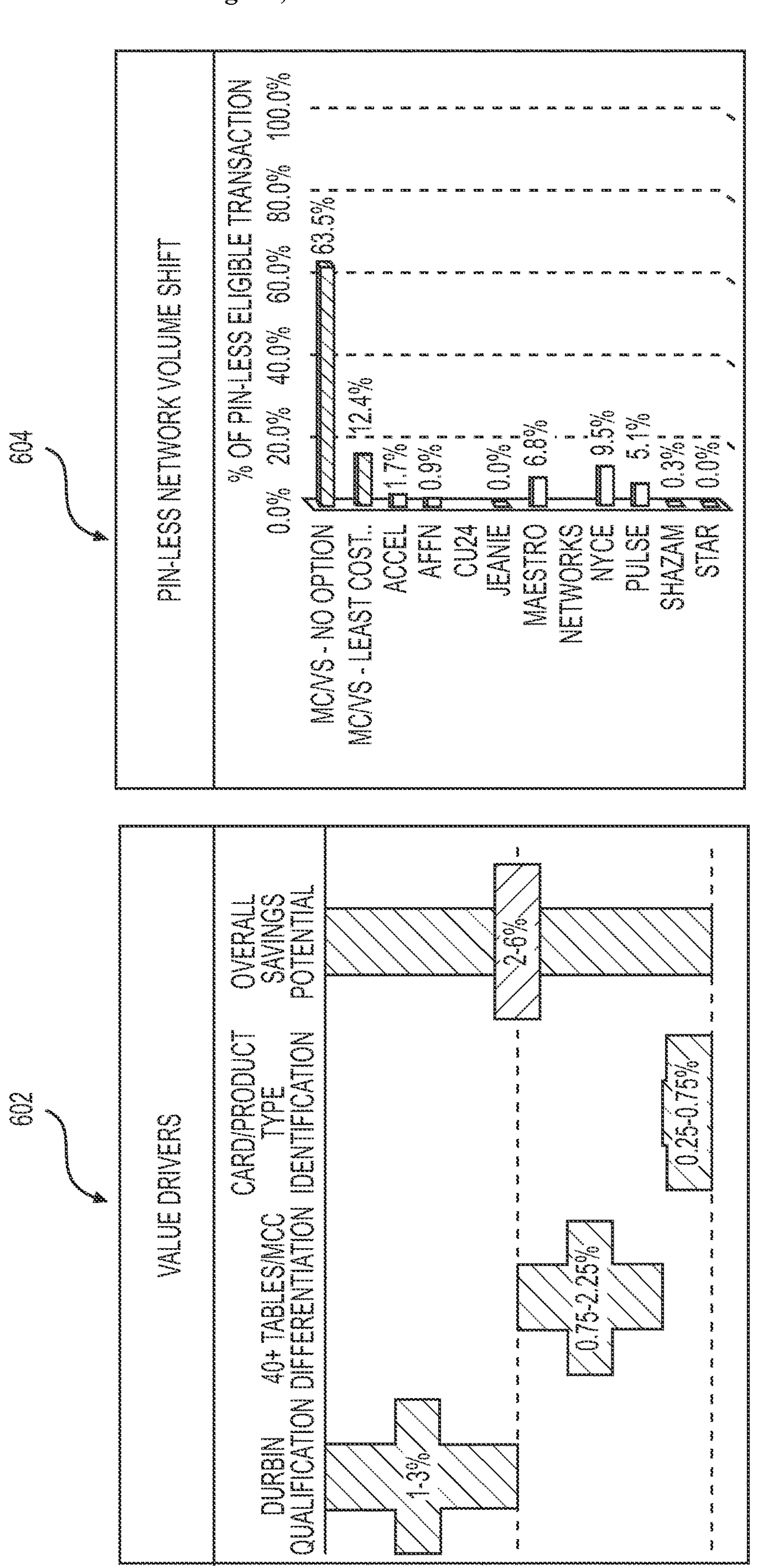
FIGS. 6A and 6B depict a report of an anonymized PIN-less debit system including a report of value drivers of savings (FIG. 6A) and a report of PIN-less network volume shift (FIG. 6B).

FIGS. 6A and 6B depict a report of anonymized PIN-less debit system including a report 602 of value drivers of savings (FIG. 6A) and a report 604 of PIN-less network volume shift (FIG. 6B). Specifically, FIG. 6A depicts a graphical report 602 of value drivers of savings including, for example, regulatory (e.g., Durbin) qualification, 40+ tables/MCC differentiation, card/product type identification, and overall savings potential. FIG. 6B depicts a graphical report 604 reflecting a representation of PIN-less network volume shift by percent (%) of PIN-less eligible transactions across various networks, including "no option" MasterCard/Visa ("MC/VS"), "least cost" MasterCard/Visa ("MC/VS"), Accel, Jeanie, Maestro, Star, and so on. The graphical reports of FIGS. 6A and 6B reflect that, given at least one sample transaction, as many as 99.94% of all signature debit transactions could satisfy current PIN-less eligibility requirements. Moreover, assuming least cost priority 24.3% of eligible signature debit transactions converted PIN-less debit assuming certain PIN-less pricing.

Figure 7:
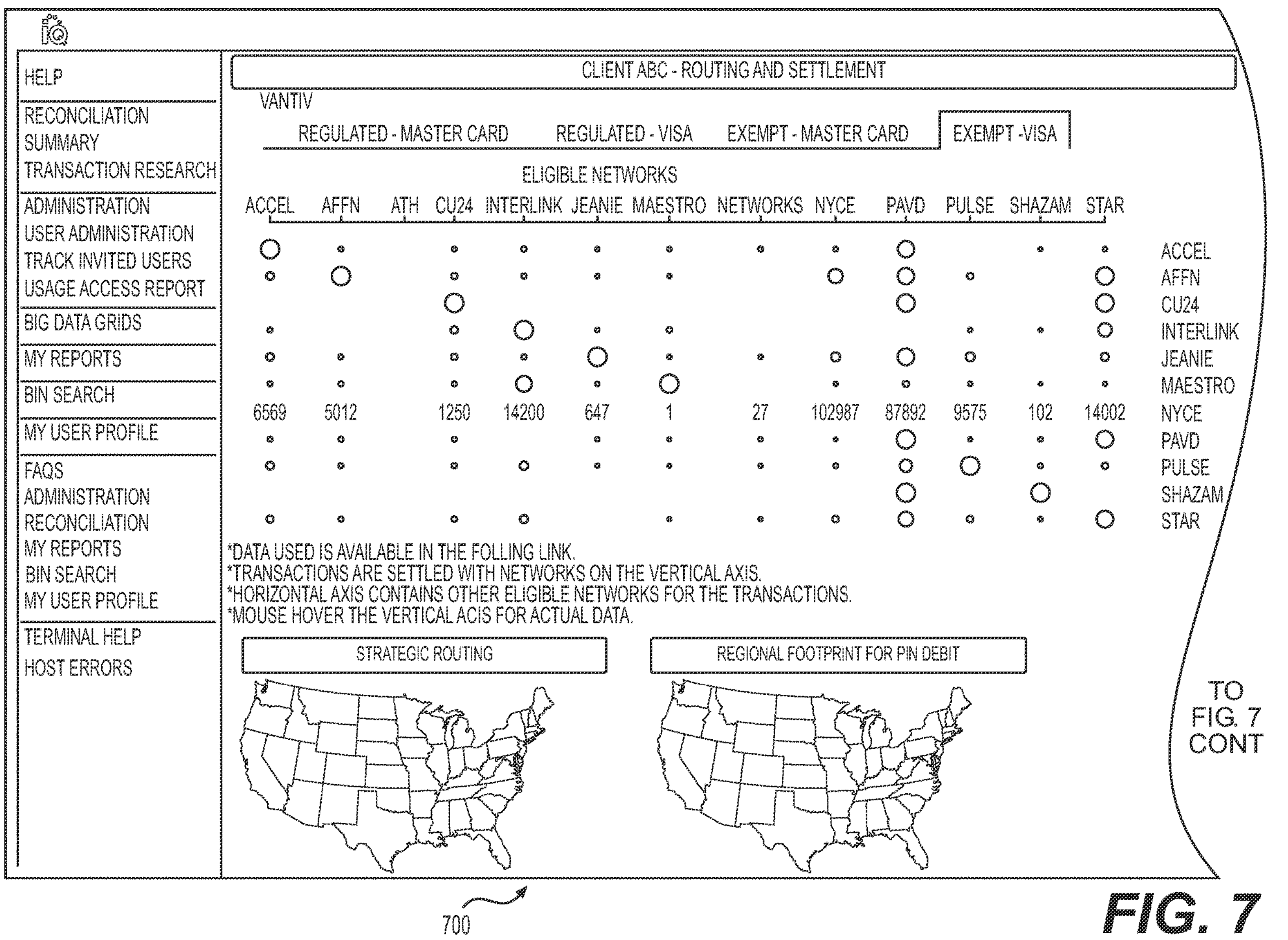
FIG. 7 is a screenshot of an exemplary graphical user interface (GUI) depicting routing and settlement results for an exemplary merchant.

FIG. 7 is a screenshot of an exemplary graphical user interface (GUI) depicting routing and settlement for an exemplary merchant, including a display of regulated vs. exempt issuer transactions and a distribution of transactions across eligible networks for the given transaction criteria.

Figure 8:
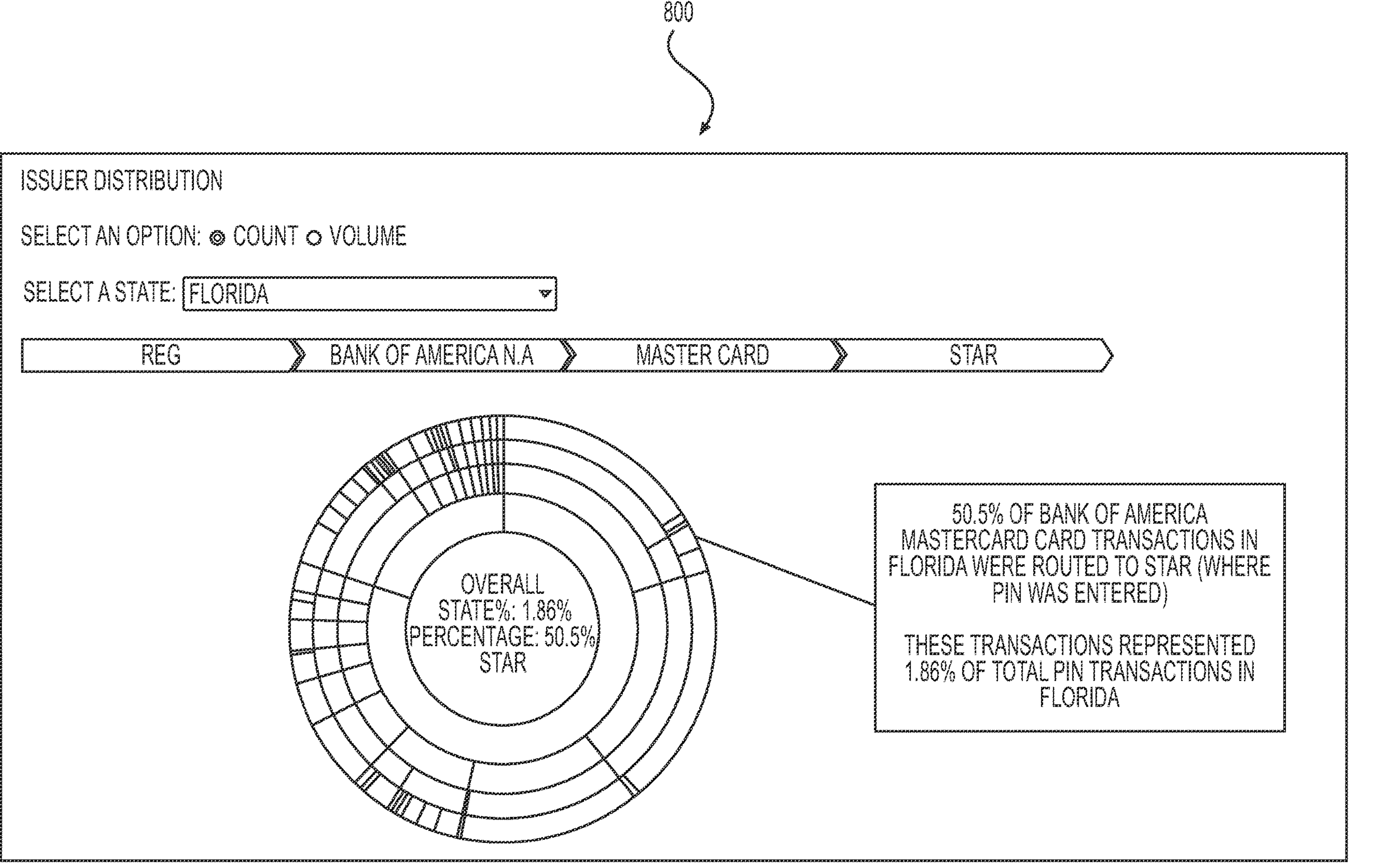
FIG. 8 is a screenshot of an exemplary graphical user interface (GUI) depicting an exemplary issuer distribution of issuer, brand, and network detail, with selective user elements enabling sorting.

FIG. 8 is a screenshot of an exemplary graphical user interface (GUI) depicting an exemplary "issuer distribution," e.g., of issuer, brand, and network detail, with selective user elements enabling sorting by count, volume, state, issuer, network, etc. As shown in FIG. 8, in one embodiment, it a circular graphical display may depict the relevant distributions by both state and percentage within a given issuer. FIG. 8 shows that, in this case, e.g., 50.5% of Bank of America MasterCard transactions in Florida were routed to Star (where the PIN was entered), and that these transactions represented 1.86% of total pin transactions in Florida. This type of interactive visualization may enable merchants (clients of the routing server system) to drill-down into debit volume by state, regulated status, issuer, brand, PIN debit network, and so on.

Figure 9:
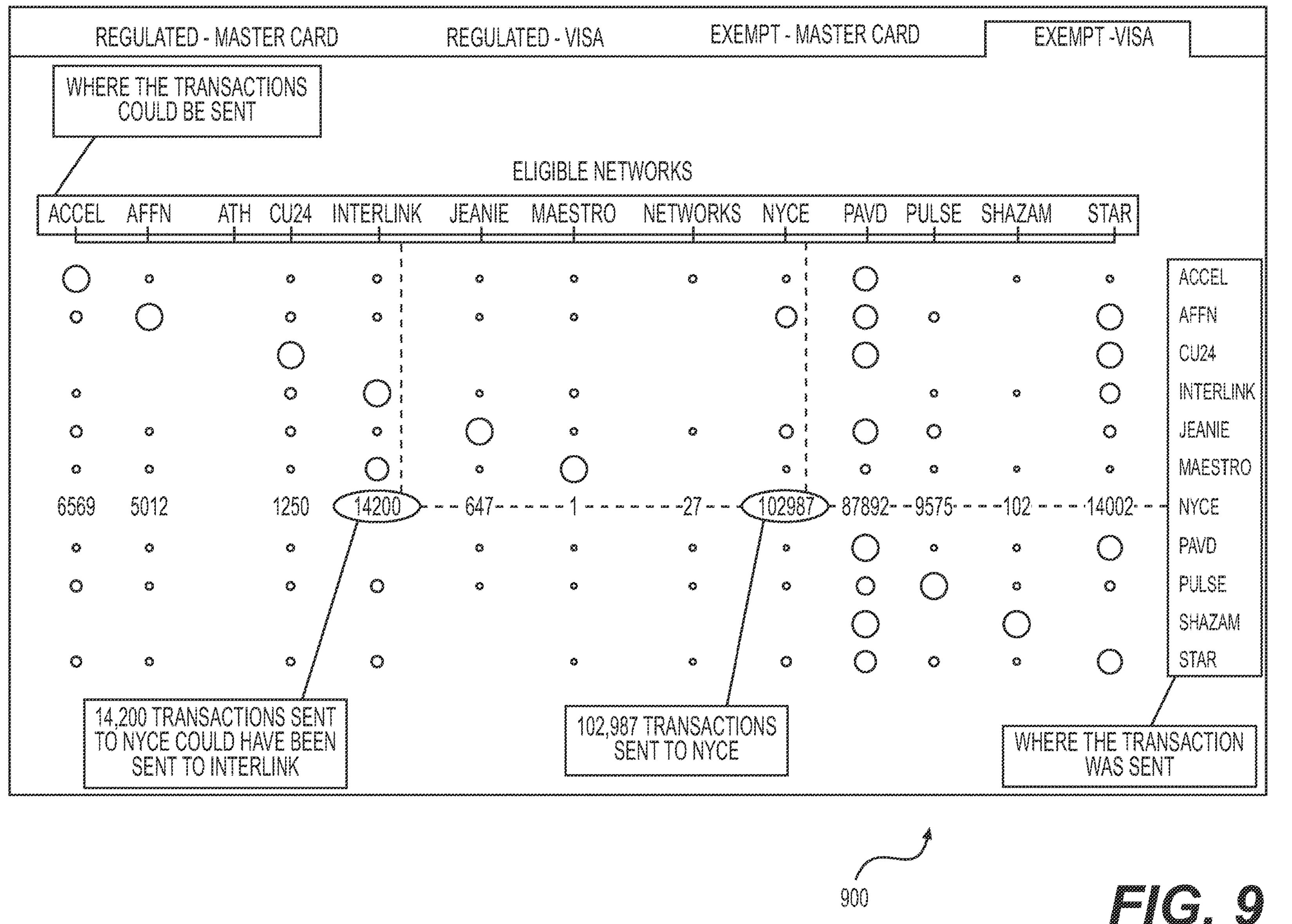
FIG. 9 is a screenshot of an exemplary graphical user interface (GUI) depicting an exemplary interface for reviewing and selecting an alternate network eligibility.

FIG. 9 is a screenshot of an exemplary graphical user interface (GUI) depicting an exemplary interface for reviewing and selecting an alternate network eligibility. Specifically, the visualization of FIG. 9 enables a merchant (client of the routing server system) to better understand a maximum volume opportunity for a given PIN debit network. As shown in FIG. 9, transactions are settled with the networks on the vertical axis, whereas the horizontal axis contains other eligible networks for the transactions. In particular, as shown in FIG. 9, in one embodiment, the disclosed interface may comprise different tabs for regulated vs. exempt issuers or networks. Each tab may comprise column headers indicating eligible networks of where transactions could be sent, row headers indicating eligible networks where the transactions were actually sent, and intersecting bubbles having sizes indicating numbers of transactions sent to one network that could have been sent to another network, at a savings. Moreover, in one embodiment, mousing over, hovering over, or touch-tapping the vertical axis, the indicated bubbles, or other locations, may expose raw and/or formatted data.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those ordinarily skilled in this area after having read this disclosure.

It is intended that the specification and examples be considered as exemplary only, with a true scope and spirit of the invention being indicated by the following claims.

What is claimed is:

1. A computer-implemented method for routing transactions using a transaction routing server, the method comprising:

receiving, by one or more processors of the transaction routing server, transaction-related information from a merchant via an electronic network;

identifying, by the one or more processors, eligible payment networks based on transaction routing criteria associated with the transaction-related information;

generating, by the one or more processors, one or more pseudo-networks corresponding to one or more of the eligible payment networks, each pseudo-network comprising a modification of a network to account for a change in regulatory exemption status or a change in preferred status;

identifying, by the one or more processors, one or more breakeven transaction amounts of the eligible payment networks at which two or more of the eligible payment networks have a same expense amount for a given transaction amount;

sorting, by the one or more processors, the eligible payment networks and the one or more pseudo-networks to identify a lowest opportunity-cost network based on the one or more breakeven transaction amounts; and routing, by the one or more processors, the transaction-related information to the lowest opportunity-cost network for processing.

2. The method of claim 1, further comprising:

generating a rate table comprising a sorting of the eligible payment networks and the one or more pseudo-networks.

3. The method of claim 2, further comprising:

receiving negotiated volume discounts or regulatory exemption thresholds; and executing a model based on routing transactions across the rate table, constrained by the negotiated volume discounts or regulatory exemption thresholds.

4. The method of claim 1, wherein the transaction-related information further includes one or more of:

a primary account number;

an issuer identification number;

a payment card number;

a mode of payment including a swiping of a card, keying in an identification related to the electronic network, a contactless mode of payment, or a mode of payment that utilizes a chip; and whether an address verification system was utilized.

5. The method of claim 1, further comprising:

generating a display of routing and settlement across the eligible payment networks.

6. The method of claim 1, further comprising:

generating a display of the lowest opportunity-cost network to which the transaction-related information was routed relative to a grouping of the eligible payment networks to which the transaction-related information could have been routed, for an overall cost savings to the merchant.

7. The method of claim 6, further comprising:

generating a plurality of user elements enabling the merchant to reveal a group of transaction routing decisions according to issuer, regulatory exemption status, and preference or preferred rate status.

8. A system comprising:

a memory configured to store instructions; and one or more processors configured to execute the instructions to perform operations comprising:

receiving, by one or more processors of a transaction routing server, transaction-related information from a merchant via an electronic network;

identifying, by the one or more processors, eligible payment networks based on transaction routing criteria associated with the transaction-related information;

generating, by the one or more processors, one or more pseudo-networks corresponding to one or more of the eligible payment networks, each pseudo-network comprising a modification of a network to account for a change in regulatory exemption status or a change in preferred status;

identifying, by the one or more processors, one or more breakeven transaction amounts of the eligible payment networks at which two or more of the eligible payment networks have a same expense amount for a given transaction amount;

sorting, by the one or more processors, the eligible payment networks and the one or more pseudo-networks to identify a lowest opportunity-cost network based on the one or more breakeven transaction amounts; and routing, by the one or more processors, the transaction-related information to the lowest opportunity-cost network for processing.

9. The system of claim 8, wherein the operations further comprise:

generating a rate table comprising a sorting of the eligible payment networks and the one or more pseudo-networks.

10. The system of claim 9, wherein the operations further comprise:

receiving negotiated volume discounts or regulatory exemption thresholds; and executing a model based on routing transactions across the rate table, constrained by the negotiated volume discounts or regulatory exemption thresholds.

11. The system of claim 8, wherein the transaction-related information further includes one or more of:

a primary account number;

an issuer identification number;

a payment card number;

a mode of payment including a swiping of a card, keying in an identification related to the electronic network, a contactless mode of payment, or a mode of payment that utilizes a chip; and whether an address verification system was utilized.

12. The system of claim 8, wherein the operations further comprise:

generating a display of routing and settlement across the eligible payment networks.

13. The system of claim 8, wherein the operations further comprise:

generating a display of the lowest opportunity-cost network to which the transaction-related information was routed relative to a grouping of the eligible payment networks to which the transaction-related information could have been routed, for an overall cost savings to the merchant.

14. The system of claim 8, wherein the operations further comprise:

generating a plurality of user elements enabling the merchant to reveal a group of transaction routing decisions according to issuer, regulatory exemption status, and preference or preferred rate status.

15. A non-transitory computer-readable medium storing instructions that, when executed by one or more processors, cause the one or more processors to perform operations comprising:

receiving, by one or more processors of a transaction routing server, transaction-related information from a merchant via an electronic network;

identifying, by the one or more processors, eligible payment networks based on transaction routing criteria associated with the transaction-related information;

generating, by the one or more processors, one or more pseudo-networks corresponding to one or more of the eligible payment networks, each pseudo-network comprising a modification of a network to account for a change in regulatory exemption status or a change in preferred status;

identifying, by the one or more processors, one or more breakeven transaction amounts of the eligible payment networks at which two or more of the eligible payment networks have a same expense amount for a given transaction amount;

sorting, by the one or more processors, the eligible payment networks and the one or more pseudo-networks to identify a lowest opportunity-cost network based on the one or more breakeven transaction amounts; and routing, by the one or more processors, the transaction-related information to the lowest opportunity-cost network for processing.

16. The non-transitory computer-readable medium of claim 15, wherein the operations further comprise:

generating a rate table comprising a sorting of the eligible payment networks and the one or more pseudo-networks.

17. The non-transitory computer-readable medium of claim 16, wherein the operations further comprise:

receiving negotiated volume discounts or regulatory exemption thresholds; and executing a model based on routing transactions across the rate table, constrained by the negotiated volume discounts or regulatory exemption thresholds.

18. The non-transitory computer-readable medium of claim 15, wherein the transaction-related information further includes one or more of:

a primary account number;

an issuer identification number;

a payment card number;

a mode of payment including a swiping of a card, keying in an identification related to the electronic network, a contactless mode of payment, or a mode of payment that utilizes a chip; and whether an address verification system was utilized.

19. The non-transitory computer-readable medium of claim 15, wherein the operations further comprise:

generating a display of routing and settlement across the eligible payment networks.

20. The non-transitory computer-readable medium of claim 15, wherein the operations further comprise:

generating a display of the lowest opportunity-cost network to which the transaction-related information was routed relative to a grouping of the eligible payment networks to which the transaction-related information could have been routed, for an overall cost savings to the merchant.

* * * * *